Dec. 24, 1963  J. HALLER  3,115,375
SELF-ALIGNING SPHERICAL BEARING
Filed Jan. 16, 1961
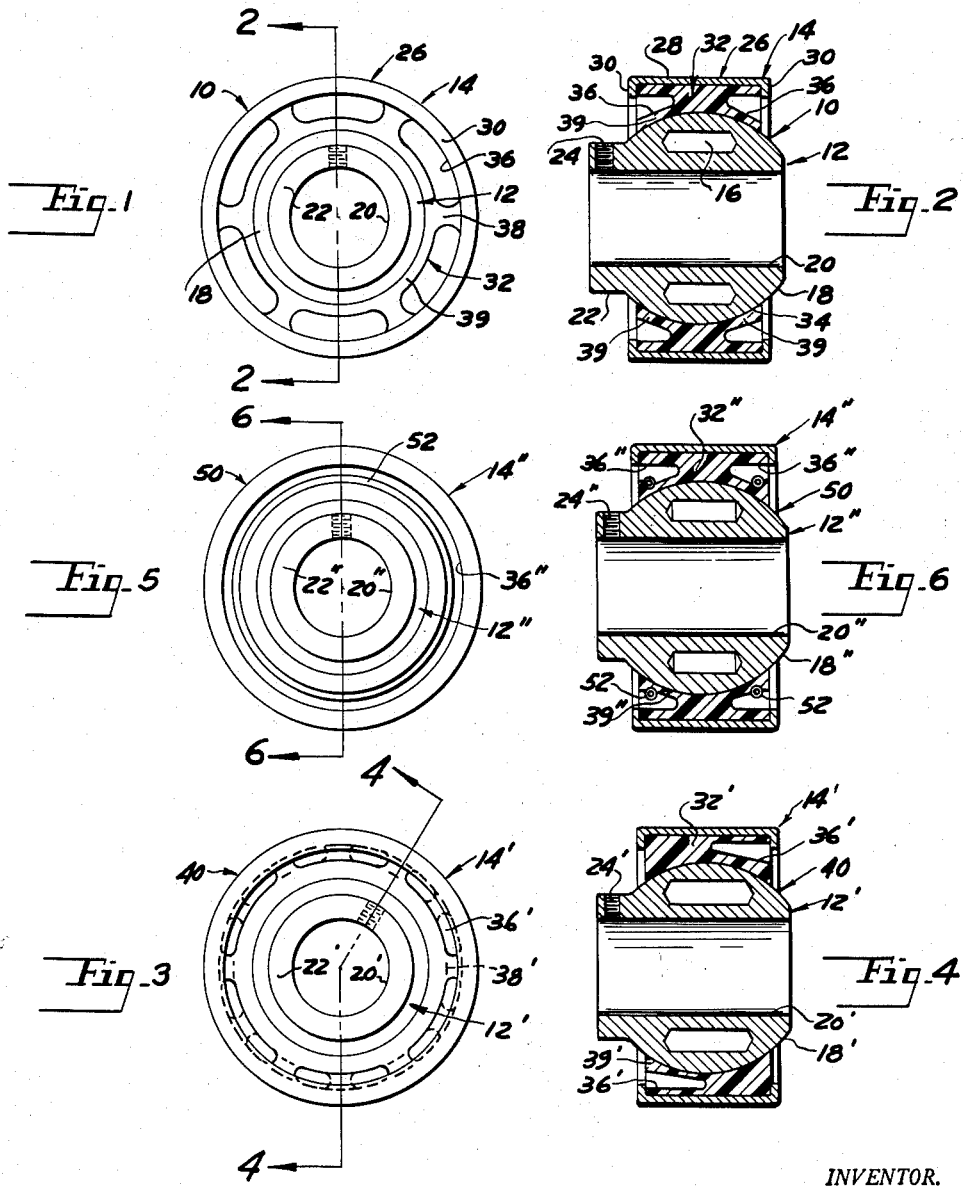
INVENTOR.
JOHN HALLER
BY
Barthel & Bugbee
ATTORNEY United States Patent Office 3,115,375
Patented Dec. 24, 1963

3,115,375
SELF-ALIGNING SPHERICAL BEARING
John Haller, 18500 Sheldon Road, Northville, Mich.
Filed Jan. 16, 1961, Ser. No. 83,032
3 Claims. (Cl. 308—72)

This invention relates to bearings and, in particular, to self-aligning spherical bearings.

One object of this invention is to provide a self-aligning spherical bearing having a ball member adapted to support a shaft encircled by an annular race member having circumferentially-extending recesses therein rendering the race member flexible so as to enable it to yield upon the occurrence of relative thermal expansion between the ball members and the race member in response to a rise in temperature thereof.

Another object is to provide a self-aligning spherical bearing of the foregoing character wherein the race member is formed from material having a greater coefficient of expansion than the ball member, such as, for example, a race member constructed from the sintered polyamide plastic material known commercially as nylon.

Another object is to provide a self-aligning spherical bearing, as set forth in the object immediately preceding, wherein the race material has an excessive coefficient of expansion in comparison to that of the ball member, so as to impart a preloading or spring effect of the race relatively to the ball member.

Another object is to provide a modified self-aligning spherical bearing of the foregoing character wherein each side of the race member has multiple recesses spaced circumferentially apart from one another and disposed either in aligned or staggered sequence or arrangement on opposite sides of the annular race member, thereby imparting more strength to the race member as it expands relatively to the ball member.

Other objects and advantages of the invention will become apparent during the course of the following description of the accompanying drawings, wherein:

FIGURE 1 is a front elevation of a self-aligning spherical bearing, according to one form of the invention, wherein multiple circumferentially-spaced aligned recesses are disposed in opposite sides of the face member;

FIGURE 2 is a central vertical section taken along the line 2—2 in FIGURE 1;

FIGURE 3 is a front elevation of a slightly modified self-aligning spherical bearing of the foregoing character wherein multiple circumferentially-spaced recesses are disposed in staggered sequence on opposite sides of the race member;

FIGURE 4 is an approximately central vertical section taken along the partly vertical and partly inclined line 4—4 in FIGURE 3;

FIGURE 5 is a front elevation of a further modified self-aligning spherical bearing similar to that of FIGURE 1 but having single substantially continuous circumferentially-extending recesses or grooves on opposite sides of the race member; and FIGURE 6 is a central vertical section taken along the line 6—6 in FIGURE 5.

Referring to the drawings in detail, FIGURE 1 shows a self-aligning spherical bearing, generally designated 10, according to one form of the invention as consisting generally of a ball member 12 seated in a composite annular outer race member 14 in such a manner as to provide for relative rocking therebetween. The ball member 12 is constructed of any suitable material, sintered powdered metal being preferable, not only for its greater ease of precise formation without machining but also because it provides a porous lubricant-containing structure which may also possess a lubricant reservoir 16 which amplifies the lubricant capacity of the bearing 10. The bearing ball member 12, as its name suggests, has a spherical convex external surface 18 and a generally cylindrical shaft-receiving surface 20. The ball member 12 also optionally has an axially-extending stem or neck portion 22 projecting exteriorly of the race member 14 and having a radial threaded hole 24 adapted to receive a set screw (not shown) for securing the shaft (not shown) in the shaft-receiving bore 20.

The composite race member 14 for convenience is preferably provided with an annular external mounting member or casing 26 of channel cross-section with a peripheral portion 28 and with circumferential flanges 30 on opposite sides thereof. Seated in the channel casing or retaining member 26 is the annular outer bearing race member 32 which in turn is provided with a spherical concave surface 34 mating with the spherical convex surface 18 of the ball member 12. The annular bearing race member 32 is provided on its opposite sides with circumferentially-spaced multiple recesses 36 extending toward the central plane of the bearing race member 14 but terminating short of that plane, and defining a generally annular external peripheral portion spaced radially away from convexo-concave inner wall portions constituting a generally annular central portion 39 containing the spherical concave bearing surface 34. The recesses 36 on each side of the bearing race member 14 are separated from one another by radial spokes or partitions 38 (FIGURE 1).

The slightly modified self-aligning spherical bearing, generally designated 40, shown in FIGURES 3 and 4 is similar in all respects to the self-aligning spherical bearing 10 of FIGURES 1 and 2 except for the arrangement of the peripheral recesses 36' extending inwardly from opposite sides of the bearing race member or component 32. In the bearing 10 of FIGURES 1 and 2, the recesses 36 on opposite sides of the bearing race component 32 extend inwardly toward one another in approximate axial alignment with one another, whereas the peripheral recesses 36' in the modified bearing 40 of FIGURES 3 and 4 on opposite sides of the bearing race component 32' are staggered relatively to one another so that the recess 36' on one side overlaps the partition or spoke 38' on the opposite side. The remaining features of construction of the modified bearing 40 are similar to those of the bearing 10 and are designated with the same reference numerals, but single primed.

The further modified self-aligning spherical bearing, generally designated 50, shown in FIGURES 5 and 6 is also generally similar to the bearing 10 of FIGURES 1 and 2, and the modified bearing 40 of FIGURES 3 and 4, except for the recesses 36''. The recesses 36'' extend unbroken or continuously in annular groove-like paths around the opposite sides of the periphery of the bearing race component 32'', there being a single recess or groove 36'' on each side without its being divided into multiple recesses by spokes or partitions like those at 38 in FIGURE 1 and 38' in FIGURE 3. An annular wire ring 52, preferably of spring wire, is seated on the inner wall of each recess 36'' nearest the ball member 12'' to further strengthen the component 32'' and in restraining engagement with the inner wall portions 39. The remaining elements of the bearing 50, being similar to the corresponding elements of the bearings 10 and 40, are designated with the same reference numerals, but double primed.

In all three forms of the invention shown in the drawings, the recesses 36, 36' and 36'' are of approximately half V-shaped cross-section with rounded or arcuate bottoms. In the modified self-aligning spherical bearing 40 of FIGURES 3 and 4, the recesses 36' being staggered relatively to one another on opposite sides of the bearing race component 32', can and preferably do extend inwardly closer to the central plane of the bearing than the aligned multiple bearing recesses 36 of FIGURE 1 or the continuous or unbroken recesses 36″ of FIGURES 5 and 6.

In the manufacture of the invention in all of its three forms 10, 40 and 50 shown in the drawings, the ball member 12 is preferably made by molding metal powder, such as powdered iron or powered bronze, in a conventional briquetting press by conventional methods, with an annular core (not shown) of lower-melting metal occupying the space intended for the lubricant reservoir 16. When the thus-molded assembly is sintered, the core melts and infiltrates into the pores of the ball metal to an extent insufficient to greatly impair its porosity but sufficient to densify it and increase its structural strength. Such procedure has been disclosed and claimed in the Haller Patent No. 2,625,452 of January 13, 1953 for Porous Bearing With Lubricant Reservoir Therein, and is beyond the scope of the present invention.

The composite outer race component consisting of the metallic channel member or casing 26 and the non-metallic bearing component 32 seated therein and preferably formed from a suitable plastic material, such as the polyamide plastic known commercially as nylon, is produced by compression of nylon powder around the ball member 12 so as to fit the latter snugly but at the same time to permit relative rocking motion therebetween. The component 32, like the ball member 12, is sintered to permanently solidify and increase the structural strength thereof. A suitable coating may be applied to the spherical surface 18 of the ball member 12 to prevent its adhesion to the race component 32, graphite being one such coating material.

In the operation of the invention in any of its three forms, the shaft or rod (not shown) to be given rocking capabilities is mounted in the bore 20, 20′ or 20″ and secured therein by a set screw inserted in the radial hole 24, 24′ or 24″, and the composite race member 14, 14′ or 14″ mounted in a suitable holding or supporting structure (not shown). As the bearing 10, 40 or 50 heats up under operating conditions, the higher coefficient of expansion of its non-metallic component 32, 32′ or 32″ causes it to expand more rapidly than the ball member 12, 12′ or 12″. Compensation, however, for the constricting effect of the race component 32, 32′ or 32″ upon the ball component 12, 12′ or 12″ occurs by reason of the presence of the recesses 36, 36′ or 36″. These permit the convexo-concave wall portions 39, 39′ or 39″ to yield outwardly and prevent the constriction from becoming serious.

What I claim is:

1. A self-aligning spherical bearing, comprising a ball member having a shaft-receiving bore in the interior thereof and a spherical convex bearing surface on the exterior thereof, and a generally annular outer race member of a synthetic plastic material having a greatly different thermal coefficient of expansion a multiplicity of times that of said ball member encircling said ball member and having a generally annular central portion containing a generally annular spherical concave bearing surface extending around the interior thereof in bearing engagement with said spherical convex bearing surface, said outer race member having a generally annular external peripheral portion extending therearound and spaced radially away from said generally annular central portion containing said spherical concave bearing surface, said outer race member having opposite side surfaces extending between its said external peripheral and central portions, said outer race member having relief recess means therein extending circumferentially around the major part of the periphery thereof and extending inwardly toward the central plane thereof from each of said opposite side surfaces, said recess means including a plurality of recesses spaced circumferentially apart from one another and extending inwardly toward said central plane from both of the opposite side surfaces of said outer race member.

2. A self-aligning spherical bearing, according to claim 1, wherein said recesses on opposite sides of said outer race member are disposed in axially-aligned pairs therearound.

3. A self-aligning spherical bearing, according to claim 1, wherein said recesses on opposite sides of said outer race member are disposed in staggered pairs overlapping one another.

References Cited in the file of this patent

UNITED STATES PATENTS

| | | |
|---|---|---|
| 2,149,983 | Smith | Mar. 7, 1939 |
| 2,814,538 | Connolly | Nov. 26, 1957 |

FOREIGN PATENTS

| | | |
|---|---|---|
| 562,608 | Great Britain | July 7, 1944 |